United States Patent [19]

Larson

[11] Patent Number: 4,565,229

[45] Date of Patent: Jan. 21, 1986

[54] WORK PIECE HOLDING DEVICE

[76] Inventor: Charles R. Larson, 509 Pleasant St., Webster City, Iowa 50595

[21] Appl. No.: 595,708

[22] Filed: Apr. 2, 1984

[51] Int. Cl.$^4$ ................................................ B27C 5/00
[52] U.S. Cl. ............................... 144/154; 144/134 A; 144/145 A; 269/50; 269/54.1; 409/165
[58] Field of Search .......... 144/134 A, 134 R, 145 A, 144/139, 154; 269/47, 50, 51, 52, 54.5, 54.1; 409/97, 104, 111, 112, 165

[56] References Cited

U.S. PATENT DOCUMENTS

| | | | |
|---|---|---|---|
| 948,784 | 2/1910 | Kramer et al. | 144/145 A |
| 1,474,296 | 11/1923 | Shown | 269/54.1 |

Primary Examiner—W. D. Bray
Assistant Examiner—Jorji M. Griffin

Attorney, Agent, or Firm—Zarley, McKee, Thomte, Voorhees & Sease

[57] ABSTRACT

The present invention is a work piece holding device for use with a work table having a power tool positioned adjacent a work station on the work table. The holding device comprises a pedestal, an elongated arm having first and second opposite ends, a universal hinge connecting the first end of the arm to the pedestal for pivotal movement about both a horizontal and a vertical axis, and a handle on the second end of the arm. A work piece holding device is rotatably mounted to the arm intermediate the opposite ends thereof, and is adapted to rotate about a vertical axis. A crank handle is connected to the work piece holding device for causing the rotation of the holding device about its vertical rotational axis with respect to the arm.

18 Claims, 7 Drawing Figures

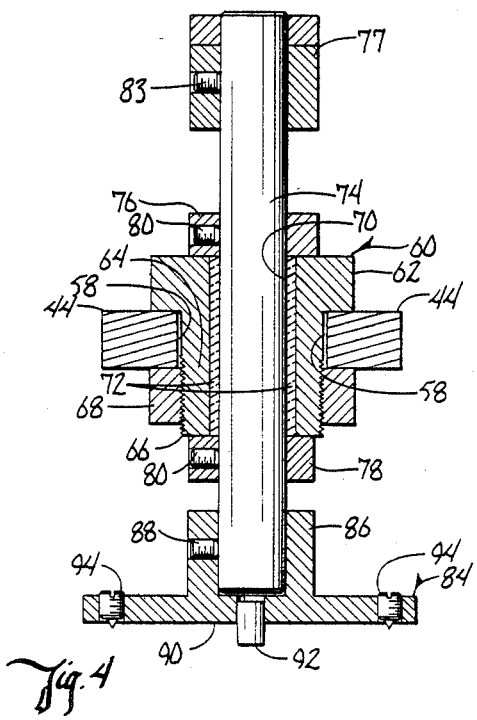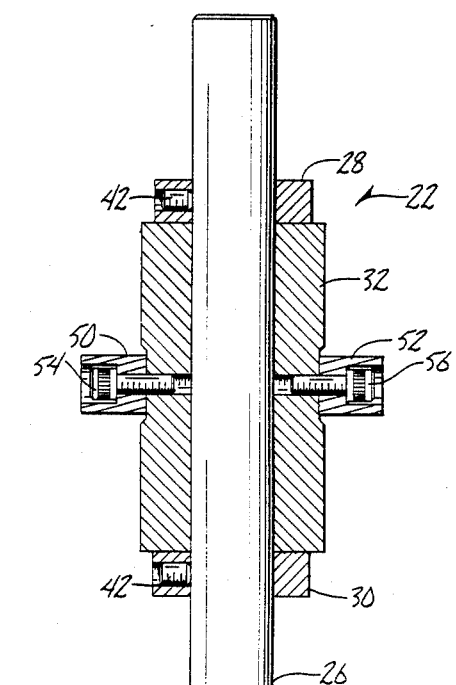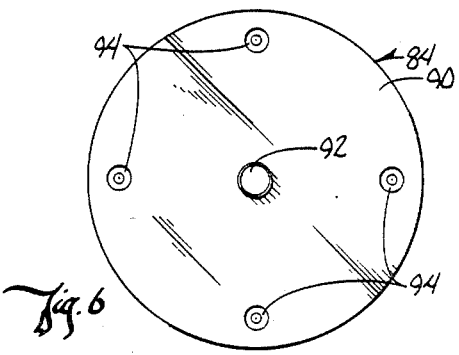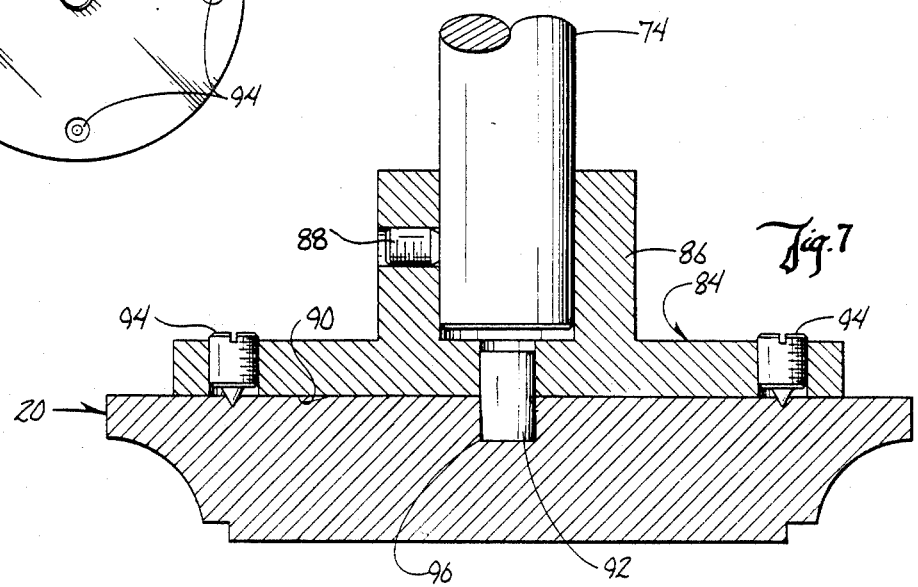

WORK PIECE HOLDING DEVICE

BACKGROUND OF THE INVENTION

This invention relates to a work piece holding device, and particularly to a device which may be used with a woodworking rotary cutting tool.

Certain problems are presently encountered when working with high speed rotary cutting tools, such as routers, shapers and the like. These tools usually are in a fixed position and protrude upwardly through a flat upwardly presented work table. The work piece is moved adjacent the rotating bit of the router or shaper, and is guided along the router or shaper to achieve the desired cutting action.

However, routers and shapers operate at very high speeds, and maintaining proper control of the work piece is often difficult. This is particularly true when the work piece is small, and a serious safety hazard is created. Particularly with small work pieces, it is quite possible for the operator's hand to slip and protrude into the rotating router or shaper bit.

Therefore a primary object of the present invention is the provision of an improved work piece holding device.

A further object of the present invention is the provision of a work piece holding device which has improved safety features so as to minimize the hazards to the operator.

A further object of the present invention is the provision of a work piece holding device which permits the operator to keep his hands a safe distance away from the cutting bit.

A further object of the present invention is the provision of a work piece holding device which has universal movement in all directions so that the operator can easily control the position of the work piece relative to the cutting bit.

A further object of the present invention is the provision of a work piece holding device which is easily adjustable so that the work piece will be held in a precise, predetermined position relative to the cutting bit.

A further object of the present invention is the provision of a work piece holding device which can be mounted upon presently existing woodworking tools.

A further object of the present invention is the provision of a device which is economical to manufacture, durable in use and efficient in operation.

SUMMARY OF THE INVENTION

The present invention is adapted for use with a work table having a router or shaper bit protruding upwardly therefrom. The present invention utilizes a pedestal which may be fixed to the upper surface of the work table by screws, bolts or the like. An elongated arm is mounted to the pedestal by means of a universal hinge which permits pivotal movement of the arm about both a vertical axis and a horizontal axis. The opposite end of the arm includes a handle for grasping by the operator.

Intermediate the opposite ends of the arm is a rotatable member which may be attached to the work piece. The rotatable member rotates about a vertical axis and includes a crank arm attached thereto. The operator places one hand on the crank arm and one hand on the handle of the elongated arm. He can move the work piece into engagement with the router or shaper bit and rotate the work piece by rotating the crank arm.

Stop means are provided on the pedestal for limiting the swinging movement of the arm about its vertical axis. The stop means can be used to stop the swinging movement of the arm as the work piece approaches the cutting tool.

An adjustable leg is attached to the arm adjacent the handle. The adjustable leg protrudes downwardly from the arm and is adapted to engage the upper surface of the work table. The leg provides a means for resting the arm on the table in a position spaced upwardly from the work table.

BRIEF DESCRIPTION OF THE FIGURES OF THE DRAWINGS

FIG. 4 is a sectional view taken along line 4—4 of FIG. 2.

FIG. 5 is a sectional view taken along line 5—5 of FIG. 2.

FIG. 6 is a bottom view of the circular plate for holding the work piece.

FIG. 7 is a partial sectional view showing the mounting of the work piece to the present invention.

DETAILED DESCRIPTION OF THE PREFERRED EMBODIMENT

Figure 1:
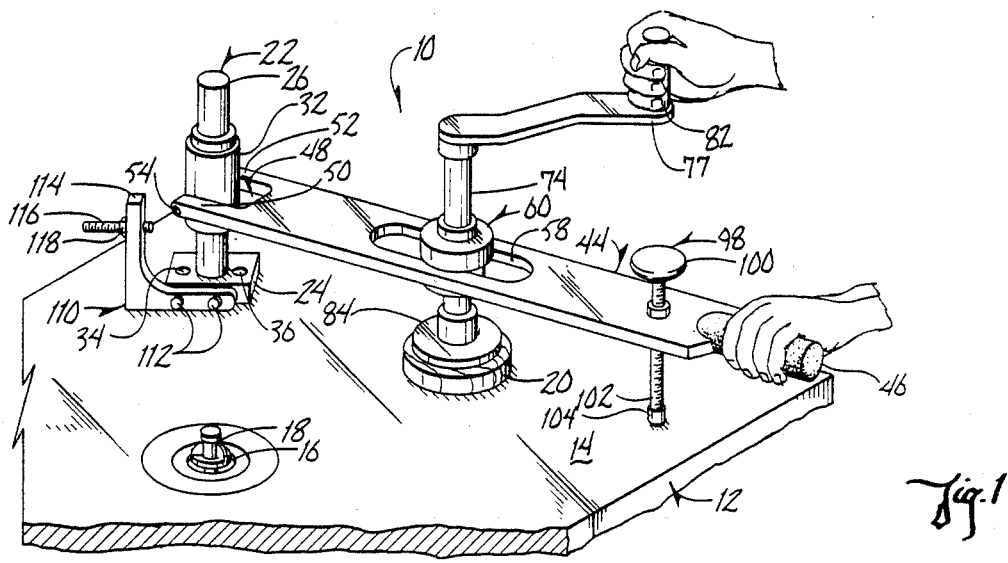
FIG. 1 is a perspective view of the present invention mounted on the upper surface of a work table.
Figure 2:
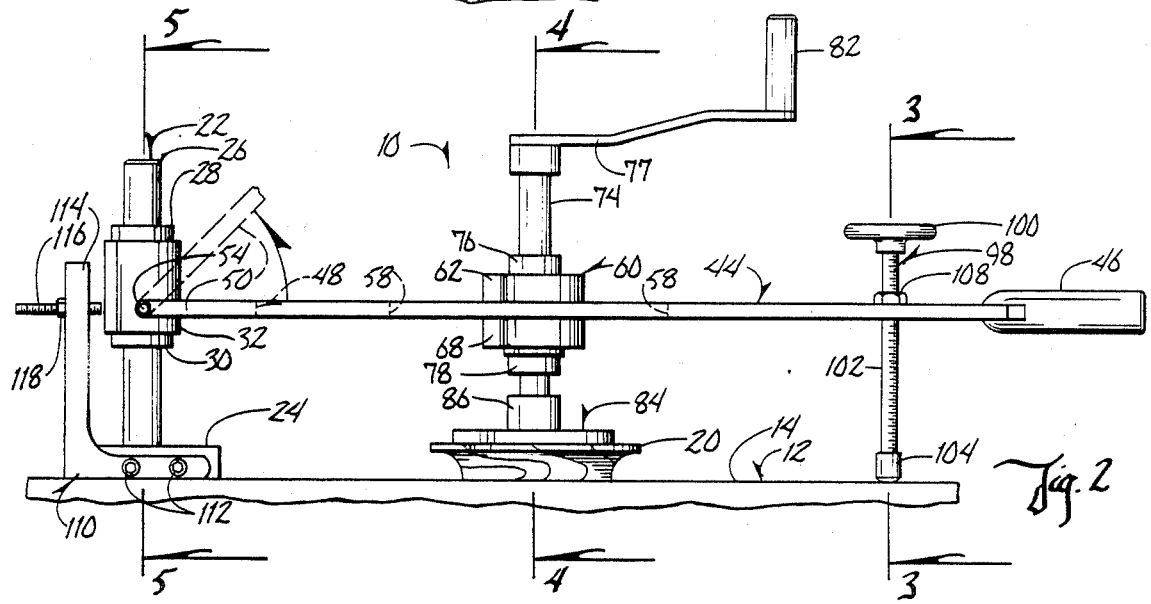
FIG. 2 is a side elevational view of the present invention.
Figure 3:
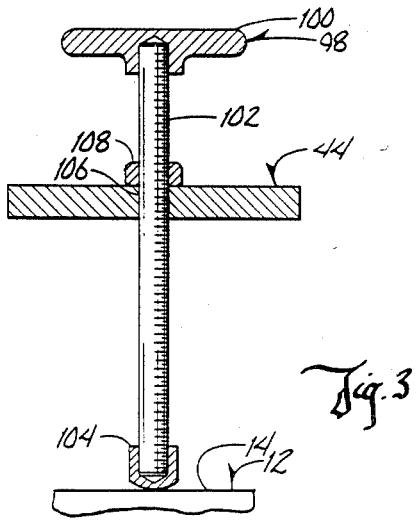
FIG. 3 is a sectional view taken along line 3—3 of FIG. 2.

Referring to the drawings, the numeral 10 generally refers to the work piece holding device of the present invention. Device 10 is shown mounted on a work table 12 having an upper surface 14. Protruding upwardly through a hole 16 is a router or shaper bit 18.

The present invention is utilized to hold a work piece 20 in proximity to the rotating bit 18 so as to shape the work piece to the desired configuration.

Device 10 includes a pedestal assembly 22 comprising a base block 24, an upstanding post 26, upper and lower fixed collets 28, 30, and a rotating sleeve 32.

Base block 24 is fixed to the upper surface 14 of table 12 by means of a pair of bolts 34, 36. Post 26 has a lower threaded end 38 which is threadably received in a threaded opening 40 in base block 24, so as to fix post 26 rigidly with respect to base block 24 and table 12. Upper and lower fixed collets 28, 30 surround post 24 and are attached thereto by means of set screws 42. Rotating sleeve 32 is positioned between upper and lower fixed collets 28, 30 and surrounds post 24. Sleeve 32 is free to rotate about post 34.

An elongated arm member 44 includes a handle 46 at one end, and a yoke 48 at the opposite end. Yoke 48 includes two spaced apart yoke members 50, 52 which embrace sleeve 32 therebetween. A pair of pivot pins 54, 56 pivotally mount yoke members 50, 52 to sleeve 32 so as to permit the pivotal hinged movement of arm 44 about a horizontal axis provided by pivot pins 54, 56. Also because of the rotatable mounting of sleeve 32 about post 24, it is possible to swing arm 44 about a vertical axis defined by the upstanding post 24.

Arm 44 is provided with an elongated slot 58 therein. Mounted within slot 58 is a bushing 60 which is T-shaped in cross-section, having a laterally extending annular flange 62 and a reduced diameter portion 64. The reduced diameter portion 64 fits within slot 58, and the annular flange 62 protrudes beyond the edges of slot 58. Reduced diameter portion 64 includes threads 66 on its lower end, and these threads receive a nut 68 which is threaded snugly against the bottom surface of arm 44 so as to secure bushing 62 tightly against movement within slot 58.

Bushing 60 has a vertical bore 70 extending therethrough. A brass bushing 72 lines bore 70.

Rotatably mounted within vertical bore 70 is an elongated rod 74. Rod 74 is held within bore 70 by means of an upper collet 76, and a lower collet 78, both of which are attached to rod 74 by means of set screws 80.

The upper end of rod 74 is attached to a crank arm 77 by means of screws 83. Crank arm 77 includes a handle 82 on one end thereof.

Mounted to the lower end of rod 74 is a circular grasping plate 84. Plate 84 includes an upwardly presented sleeve 86 which receives the lower end of rod 74 and which is attached thereto by means of screws 88. Plate 84 has a downwardly presented surface 90 which is provided with a downwardly extending pin 92 located in the approximate circular center of plate 84. Around the periphery of plate 84 are a plurality of sharp pointed members 94 which protrude downwardly. Plate 84 is shown in FIG. 7 engaging a work piece 20. Work piece 20 is initially provided with a hole 96 which is sized to receive pin 92 of plate 84. Pin 92 is inserted into hole 96 and the sharp pointed members 94 are forced into the upper surface of the work piece.

Mounted to arm 44 adjacent handle 46 is a support leg 98. Support leg 98 comprises a handle 100 having a downwardly extending threaded shank portion 102, and having a foot 104 at the lower end thereof. Threaded shank portion 102 extends through a threaded opening 106 in arm 44 and is held against movement by means of a locking nut 108. The vertical distance of foot 104 below arm 44 can be adjusted by loosening locking nut 108 and by rotating handle 100 until the foot 104 is the desired distance below arm 44. Foot 104 is adapted to rest on the upper surface 14 of the work table 12, and can be adjusted so as to prevent the pointed members 94 from engaging the work table whenever a work piece is not attached to grasping plate 84.

An L-shaped member 110 is bolted to base block 24 by bolts 112, and includes an upstanding leg 114. Threadably extending through upstanding leg 114 is an elongated stop member 116 having a lock nut 118 thereon. Stop member 116 is adapted to engage the edge of arm 44 whenever arm 44 rotates in a clockwise direction (as viewed in FIG. 1), toward the router bit 18. The threaded mounting of stop member 116 within upstanding leg 114 permits the stop member to be positioned so as to stop the swinging movement of arm 44 at the desired point, where the work piece begins to engage router bit 18.

In operation. the work piece to be worked upon is mounted to grasping plate 84 in the manner shown in FIG. 7. Arm 44 is then rotated about its vertical axis until the work piece is adjacent the router bit 18. This is done with the router bit 18 turned off. A further adjustment is then made of the position of the bushing 60 within slot 58. This is accomplished by loosening nut 68, and by sliding bushing 60 longitudinally within slot 58 until the desired position is achieved. Then nut 68 is again tightened to hold the bushing against longitudinal movement within slot 58.

The arm 44 is then swung away from the router bit and the router bit is turned on. The arm can then be moved toward the router bit until the work piece 20 engages the router bit. The work piece 20 rests upon the table 14, and is rotated by means of crank arm 76. The operator places one hand on the handle 82 of crank arm 76 and the other hand on the handle 46. It is possible to move handle 46 both vertically and horizontally by means of the universal hinge provided by rotating sleeve 32 and pins 56. The present device is shown grasping a small circular work piece 20, but the work piece does not have to be circular. The present invention will work equally well with irregularly shaped or rectangularly shaped pieces. The stop member 16 can be adjusted so as to limit the swinging movement of arm 44 toward bit 18.

When the work piece is removed, the device may be rested on the work table by letting the foot 104 rest on the upper surface of the table. This prevents the pointed members 94 from engaging and scratching the upper surface 14 of table 12.

Thus, it can be seen that the device accomplishes at least all of its stated objectives. The device provides a safe means whereby a small work piece may be held in close proximity to the rotating bit 18. The operator's hands are kept far away from the rotating bit so as to minimize the danger of an accident. Furthermore, a strong positive means is provided for holding the work piece so that high quality result can be obtained with the work piece. The device is very simple, and can be attached to the work table of anv presently known equipment.

What is claimed is claim is:

1. A work piece holding device for use with a work table having a flat upper surface and a work station on said upper surface, a power work tool positioned adjacent said work station, said holding device comprising:

a pedestal adapted to be fixed to said work table;
an elongated arm member having first and second opposite ends;
universal hinge means connecting said first end of said arm member to said pedestal for pivotal movement about a horizontal axis and also for swinging movement about a vertical axis;
handle means on said second end of said arm member;
work piece holding means;
bearing means for rotatably mounting said holding means to said arm member at a point intermediate said first and second opposite ends thereof, said bearing means permitting rotation of said holding means with respect to said arm member about a rotational axis which is perpendicular to the longitudinal axis of said arm member;
crank means connected to said holding means for causing rotation of said holding means about said rotational axis and
a leg member mounted to said arm member adjacent said second end thereof, said leg member extending downwardly from said arm member and having a foot at its lower end for engaging said upper surface of said table.

2. A device according to claim 1 comprising adjustment means for permitting the selective adjustable movement of said bearing means along said longitudinal axis of said arm member.

3. A device according to claim 2 wherein said arm member includes a longitudinal slot therein, said bearing means being fitted within said slot, said adjustment means permitting selective attachment and detachment of said bearing means in a plurality of positions along the length of said slot.

4. A device according to claim 4 wherein said leg member is adjustably mounted to said arm member for adjustment of the vertical distance of said foot below said arm member.

5. A device according to claim 4 wherein said leg member is threadably mounted to said arm member so as to permit vertical threaded adjustment of the distance of said foot below said arm member.

6. A device according to claim 1 wherein adjustable stop means are connected to said pedestal, said stop means being selectively positioned to engage and limit swinging movement of said arm member about said vertical axis.

7. A device according to claim 6 wherein said stop means is adjustably movable relative to said arm member.

8. A device according to claim 7 wherein said stop means is threadably adjustable.

9. A device according to claim 1 wherein said work piece holding means comprises a plate having a downwardly presented surface, grasping means being on said downwardly presented surface for retentively engaging a work piece.

10. A work piece holding device for use with a work table having a flat upper surface and a work station on said upper surface, a power work tool positioned adjacent said work station, said holding device comprising:
   a pedestal adapted to be fixed to said work table;
   an elongated arm member having first and second opposite ends;
   universal hinge means connecting said first end of said arm member to said pedestal for pivotal movement about a horizontal axis and also for swinging movement about a vertical axis;
   handle means on said second end of said arm member;
   work piece holding means;
   bearing means for rotatably mounting said holding means to said arm member at a point intermediate said first and second opposite ends thereof, said bearing means permitting rotation of said holding means with respect to said arm member about a rotational axis which is perpendicular to the longitudinal axis of said arm member;
   crank means connected to said holding means for causing rotation of said holding means about said rotational axis; and
   adjustable stop means connected to said pedestal, said stop means being selectively positioned to engage and limit swinging movement of said arm member about said vertical axis.

11. A device according to claim 10 comprising adjustment means for permitting the selective adjustable movement of said bearing means along said longitudinal axis of said arm member.

12. A device according to claim 11 wherein said arm member includes a longitudinal slot therein, said bearing means being fitted within said slot, said adjustment means permitting selective attachment and detachment of said bearing means in a plurality of positions along the length of said slot.

13. A device according to claim 10 wherein a leg member is mounted to said arm member adjacent said second end thereof, said leg member extending downwardly from said arm member and having a foot on its lower end for engaging said upper surface of said table.

14. A device according to claim 13 wherein said leg member is adjustably mounted to said arm member for adjustment of the vertical distance of said foot below said arm member.

15. A device according to claim 14 wherein said leg member is threadably mounted to said arm member so as to permit vertical threaded adjustment of the distance of said foot below said arm member.

16. A device according to claim 10 wherein said stop means is adjustingly movable relative to said arm member.

17. A device according to claim 16 wherein said stop means is threadably adjustable.

18. A device according to claim 10 wherein said work piece holding means comprises a plate having a downwardly presented surface, grasping means being on said downwardly presented surface for retentively engaging a work piece.

* * * * *